(12) United States Patent
Eren et al.

(10) Patent No.: US 9,570,970 B1
(45) Date of Patent: Feb. 14, 2017

(54) METHOD AND APPARATUS FOR USE WITH GRID CONNECTED INVERTERS IN DISTRIBUTED POWER GENERATION

(71) Applicants: Suzan Eren, Kingston (CA); Majid Pahlevaninezhad, Kingston (CA); Praveen Jain, Kingston (CA)

(72) Inventors: Suzan Eren, Kingston (CA); Majid Pahlevaninezhad, Kingston (CA); Praveen Jain, Kingston (CA)

( * ) Notice: Subject to any disclaimer, the term of this patent is extended or adjusted under 35 U.S.C. 154(b) by 68 days.

(21) Appl. No.: 14/808,408

(22) Filed: Jul. 24, 2015

(51) Int. Cl.
*H02M 1/08* (2006.01)
*H02M 1/12* (2006.01)
*H02M 7/5387* (2007.01)
*H02M 7/44* (2006.01)

(52) U.S. Cl.
CPC ............. *H02M 1/12* (2013.01); *H02M 7/44* (2013.01)

(58) Field of Classification Search
CPC .......... H02M 1/08; H02M 1/12; H02M 7/537; H02M 7/5387; H02M 7/53871; H02M 7/53873
USPC .................................. 363/40, 41, 95, 97, 98
See application file for complete search history.

(56) References Cited

U.S. PATENT DOCUMENTS

| | | | | |
|---|---|---|---|---|
| 8,184,456 B1* | 5/2012 | Jain | ................ | H02M 5/29 363/21.02 |
| 2010/0236612 A1* | 9/2010 | Khajehoddin | ............ | G05F 1/67 136/252 |
| 2011/0130889 A1* | 6/2011 | Khajehoddin | .......... | H02J 3/383 700/298 |
| 2013/0051103 A1* | 2/2013 | Roscoe | ............. | H02M 7/53871 363/131 |
| 2014/0078780 A1* | 3/2014 | Khajehoddin | .......... | H02M 1/00 363/13 |
| 2014/0211521 A1* | 7/2014 | Mazumder | .............. | H02M 7/48 363/40 |
| 2014/0268957 A1* | 9/2014 | Khajehoddin | ........ | H02J 3/1842 363/95 |
| 2015/0171734 A1* | 6/2015 | Yu | ........................... | H02M 1/12 363/45 |
| 2015/0229234 A1* | 8/2015 | Park | ........................ | H02M 1/12 363/78 |
| 2015/0326144 A1* | 11/2015 | Pahlevaninezhad | .. | H02M 7/537 363/97 |
| 2016/0049880 A1* | 2/2016 | Kim | ........................ | H02M 7/10 363/35 |
| 2016/0094149 A1* | 3/2016 | Pahlevaninezhad | .. | H02M 1/126 363/97 |

* cited by examiner

*Primary Examiner* — Jeffrey Sterrett
(74) *Attorney, Agent, or Firm* — Brion Raffoul

(57) ABSTRACT

Systems, methods, and devices relating to the controlling of a grid-connected inverter. A grid connected inverter is controlled by a proportional-resonant controller which tracks the grid current. To adjust for changes in grid conditions, an update block dynamically and continuously adjusts coefficients used by the controller to ensure high gains provided by the controller at the grid frequency. A harmonic compensator is also provided to ensure that high loop gains at harmonic frequencies of the grid frequency are also provided for. To also adjust for changing grid conditions, a second update block also continuously adjusts the coefficients used by the harmonic compensator.

12 Claims, 13 Drawing Sheets

METHOD AND APPARATUS FOR USE WITH GRID CONNECTED INVERTERS IN DISTRIBUTED POWER GENERATION

TECHNICAL FIELD

The present invention relates to control systems for grid-connected DC/AC converters. More specifically, the present invention relates to methods for controlling the output current of a grid connected inverter used in distributed power generation.

BACKGROUND OF THE INVENTION

Distributed power generation is the key to global energy sustainability. Extracting power from renewable energy sources with a distributed generation platform seems to be the only sustainable solution for future power generation. Grid-connected inverters are the interface between the renewable energy power conditioning systems and the utility grid. The grid-connected inverter is responsible for delivering high quality power to the utility grid. In particular, the control system of the inverter is responsible for injecting a high quality current into the utility grid. Regulatory standards for interconnecting renewable energy sources with utility grids impose very strict requirements on the quality of the output current. Particularly, the quality of the current relates to its harmonic contents and its angle with respect to the grid voltage. This angle is called Power Factor (PF).

The control system for the grid connected inverter is responsible for shaping the output current of the inverter to a nearly sinusoidal waveform. The reference signal for the inverter output current is a sinusoidal waveform with a proper angle with respect to the grid voltage. Ideally, the control system controls the inverter output such that the inverter output current tracks this sinusoidal waveform. The sinusoidal waveform has the same frequency as the grid frequency (i.e. the line frequency). In order to track the sinusoidal reference signal, the control loop should have a very high gain at the frequency of the reference signal (i.e. line frequency).

Proportional-Resonant (PR) controllers can be used to provide high gain at the line frequency. These PR controllers are commonly used to provide a very high gain at the frequency of the reference signal by tuning the frequency of the PR-controller to the grid frequency. Also, if a third-order LCL-filer is used at the output of the inverter, a PR-controller, along with a linear state-feedback, can be used to control the output current and to thereby damp the resonance created by the LCL-filter. FIG. 1 shows a typical closed-loop control system for a grid-connected inverter used in distributed power generation according to the prior art. In FIG. 1, a PR-controller is used to provide a high gain at the line frequency. Also in FIG. 1, a harmonic compensator is used to provide high gains at the harmonic frequencies for harmonic rejection of the inverter output current. In addition, a linear state-feedback is used to actively damp the resonance created by the LCL-filter at the output of the inverter.

The digital implementation of the PR-controller has some challenges. One of the main challenges is the effect of the approximation used to discretize the PR controller. The transfer function of the PR controller should be converted from the Laplace domain (s-domain) to the discrete domain (z-domain) for the digital implementation. This approximation creates a deviation of the resonant frequency of the PR controller and, in turn, creates a phase-shift between the output current of the inverter and the reference signal. The other problem is the accuracy required to implement the coefficient of the PR-controller in the discrete domain in order to maintain the resonant frequency at the line frequency. Due to the digital truncation, there might be a large deviation in the resonant frequency of the discrete PR-controller and the line frequency, leading to poor tracking of the reference signal by the control system.

There is therefore a need for systems, methods, or devices which address or mitigate the above issues with the prior art.

SUMMARY OF INVENTION

The present invention provides systems, methods, and devices relating to the controlling of a grid-connected inverter. A grid connected inverter is controlled by a proportional-resonant controller which tracks the grid current. To adjust for changes in grid conditions, an update block dynamically and continuously adjusts coefficients used by the controller to ensure high gains provided by the controller at the grid frequency. A harmonic compensator is also provided to ensure that high loop gains at harmonic frequencies of the grid frequency are also provided for. To also adjust for changing grid conditions, a second update block also continuously adjusts the coefficients used by the harmonic compensator.

In a first aspect, the present invention provides a system for controlling a grid connected inverter, the system comprising:
  a proportional-resonant controller for sinusoidal reference tracking of a reference grid current and for providing a high gain at a specific line frequency, said controller receiving said grid current;
  a first update law block for continuously providing updated controller coefficients for said controller, said first update law block receiving said grid current and a sinusoidal signal related to said line frequency, said first update law block adjusting said controller coefficients based on said grid current and said line frequency;
  a harmonic compensator block for removing current harmonics by providing high gains at harmonic frequencies of said specific line frequency;
  a second update law block for continuously providing compensator coefficients for said harmonic compensator block, said second update law block receiving said grid current and said line frequency, said second update law block adjusting said compensator coefficients based on said grid current and said line frequency;
  wherein
  outputs of said controller and said compensator are combined to produce a duty cycle signal for said inverter.

In a second aspect, the present invention provides a method for controlling a grid connected inverter, the method comprising:
  a) receiving a grid current at a controller for said inverter and at a harmonic compensator block;
  b) receiving said grid current and a line frequency for said grid at a first and a second update blocks;
  c) determining controller coefficients for said controller based on said grid current and said line frequency;
  d) passing said controller coefficients to said controller;
  e) determining compensator coefficients for said compensator block based on said grid current and said line frequency;
  f) passing said compensator coefficients to said compensator;

g) determining a controller output based on said grid current and said controller coefficients;

h) determining a compensator output based on said grid current and said compensator coefficients;

i) combining said controller output and said compensator output to result in a duty cycle for said inverter;

j) sending said duty cycle to said inverter.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect, the present invention relates to an improved PR-controller which is able to precisely follow the line frequency and to provide nearly perfect tracking of the reference signal. The scheme of the invention adaptively tracks the line frequency and tunes the PR-controller accordingly in order to achieve high gain for the control loop and as well as zero phase-shift in the reference signal tracking. One of the useful aspects of the controller in the present invention is the very simple digital implementation of the control system.

Figure 1:
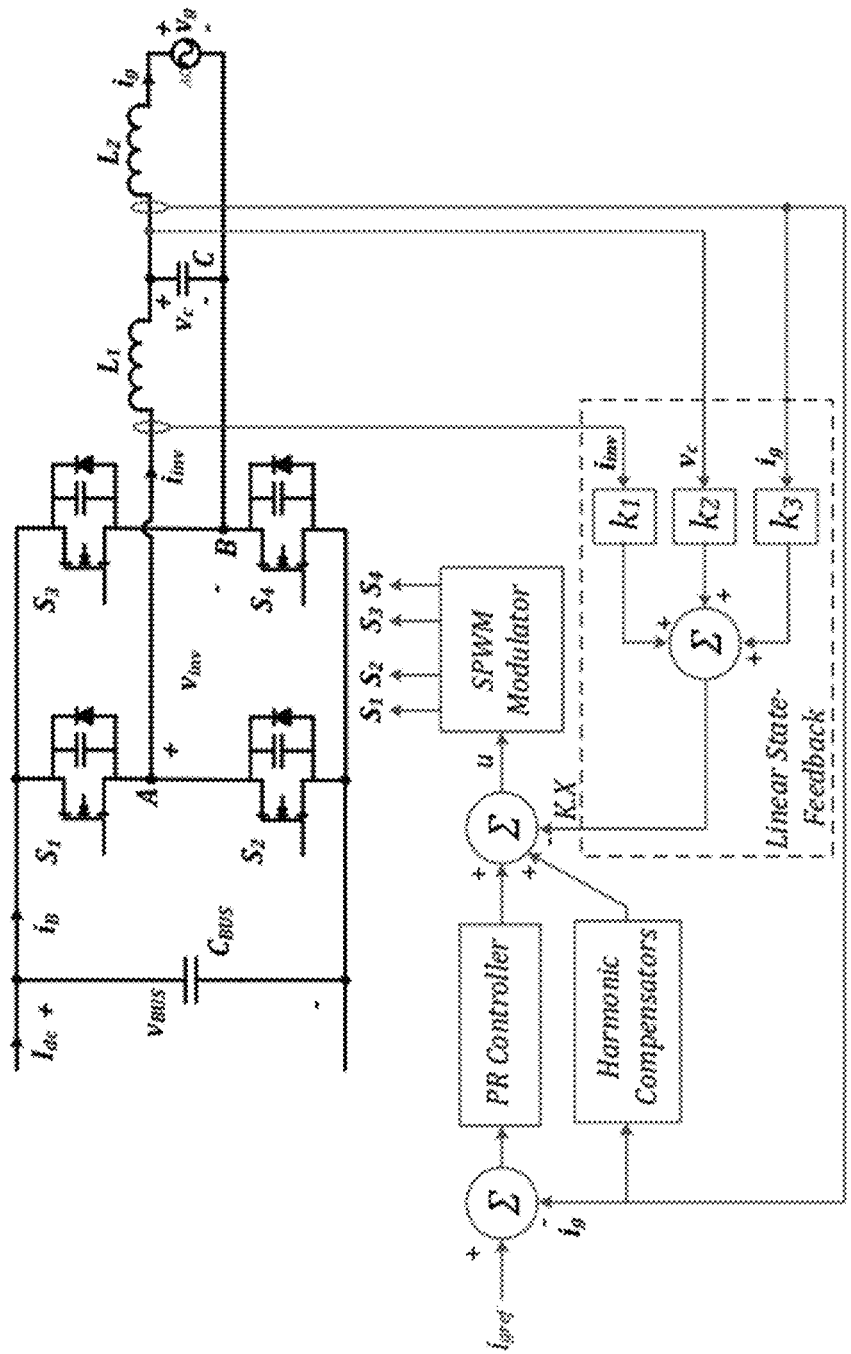
FIG. 1 is block diagram of a typical closed loop control system for a grid-connected inverter according to the prior art.
Figure 2:
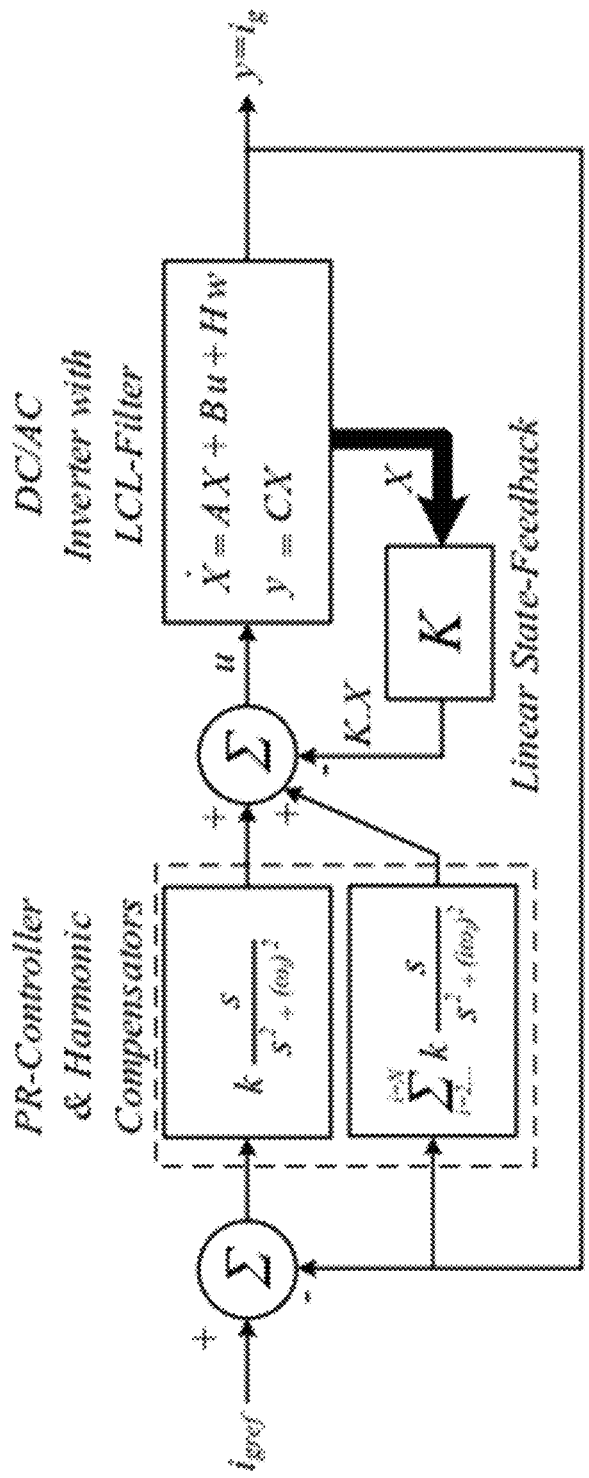
FIG. 2 is a block diagram of a closed loop current control system according to the prior art.

FIG. 2 shows a block diagram of the closed-loop current control system for a grid-connected inverter with an LCL-filter according to the prior art. According to FIG. 2, the current control loop includes a main PR-controller 10 and a harmonic compensator 20 along with a linear state-feedback controller 30. The PR controller 10 is responsible for the sinusoidal reference tracking of the grid current. The harmonic compensator 20 is responsible for eliminating the current harmonics by providing high loop gains at the harmonic frequencies. The linear state-feedback 30 guarantees the stability of the closed-loop control system by placing the closed-loop poles on the left-half plane.

The PR controller in FIG. 2 is merely a bandpass filter, which has a high gain at the line frequency. The transfer function of the PR controller is given by:

$$H(s) = \frac{s}{s^2 + 2\zeta s + \omega_l^2} \quad (1)$$

where $\omega_l$ is the centre frequency of the passband. This structure allows for a very high gain at line frequency $\omega_l$. The width of the passband, or the quality factor of the resonance, is adjusted by the damping parameter $\zeta$. As $\zeta$ increases, the phase transition becomes more gradual but the reduction in the gain of the system is a more noticeable result. Usually, the resonant controller is designed to have a very low damping ratio, (i.e. $\zeta \approx 0$), in order to have sufficient gain for nearly perfect tracking of the sinusoidal signal. From this, the transfer function of the PR controller is given by:

$$H_{PR}(s) = \frac{s}{s^2 + \omega_l^2} \quad (2)$$

In the circuit in FIG. 2, the PR controller has an almost infinite gain at the grid frequency to render the steady-state error to zero. Thus, the nearly perfect tracking of the error of the fundamental component is achieved. However, due to the limited bandwidth of the PR controller, it cannot compensate for the harmonics. Such harmonics originate from non-linearities in the system, such as quantization, signal conditioning circuits, and, particularly, switching dead-time to prevent shoot-through. In order to compensate for the presence of such distortions, the harmonic compensator is used. The harmonic compensator has the same structure as the PR controller. For each problematic harmonic, the centre frequencies can be tuned for the respective harmonic frequency. The harmonic compensator is usually tuned for the $3^{rd}$, $5^{th}$, $7^{th}$, and $9^{th}$ harmonics. The transfer function of the harmonic compensator is thus given by:

$$H_{HC} = \sum_{h=2,3,\ldots}^{n} -k \cdot \frac{s}{s^2 + (h\omega_l)^2} \quad (3)$$

It should be noted that there are three main challenges with the digital implementation of the PR controller as well as the harmonic compensator. The first challenge relates to the discrete approximation of the PR controller. The second challenge relates to the truncation of coefficients due to the limited number of bits. The third challenge relates to the frequency variations of the grid. These three challenges cause a steady state error in the tracking of the sinusoidal reference for the grid current. These three challenges are described below in detail.

In order to digitally implement the PR controller, the transfer function of the PR controller must be converted from the continuous-time domain into a transfer function in the discrete-time domain. The conversion of the transfer function from the continuous-time domain to the discrete-time domain is carried out through an approximation. There are three commonly used approximations: the Forward Euler transformation, the Backward Euler transformation, and the Bi-linear or Tustin's transformation. The bilinear transformation results in a more precise approximation compared to the other two transformations. The bilinear transformation is given by:

$$s \rightarrow \frac{2}{T_s}\frac{z-1}{z+1} \quad (4)$$

The z-domain equivalent of the continuous-time transfer function of the PR controller given by:

$$H_{PR}(s \rightarrow z) = \frac{\frac{2}{T_s}\frac{z-1}{z+1}}{\left(\frac{2}{T_s}\frac{z-1}{z+1}\right)^2 + \omega_l^2} \quad (5)$$

From the above, the transfer function of the PR controller in the z-domain is given by:

$$H_{PR}(z) = \frac{b(1-z^{-2})}{1 - az^{-1} + z^{-2}} \quad (6)$$

$$b = \frac{2T_s}{T_s^2 \omega_l^2 + 4} \quad (7)$$

$$a = 2\frac{4 - T_s^2 \omega_l^2}{4 + T_s^2 \omega_l^2} \quad (8)$$

and where T is the sampling period.

Figure 3:
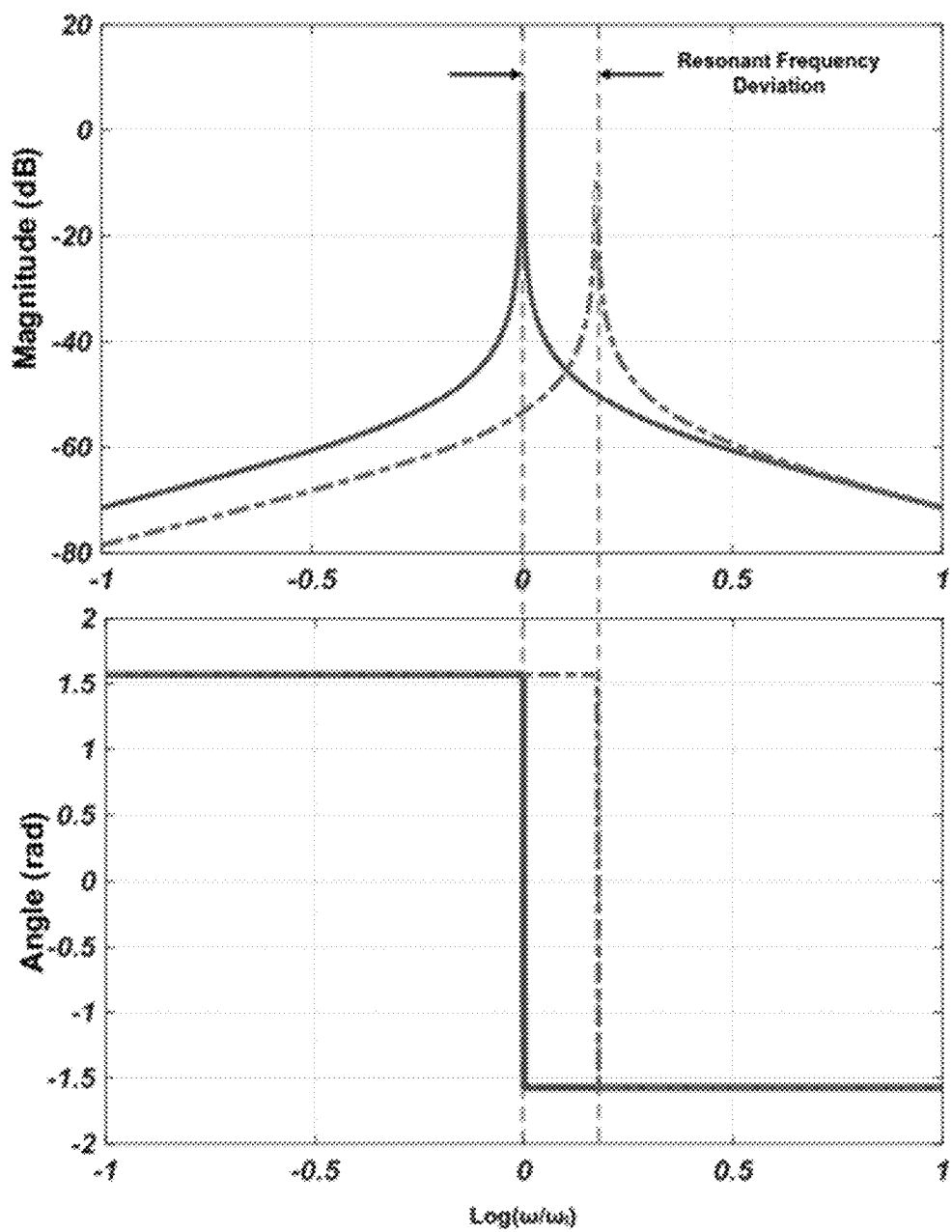
FIG. 3 is a Bode plot of the continuous-time transfer function of one of the equations.
Figure 4:
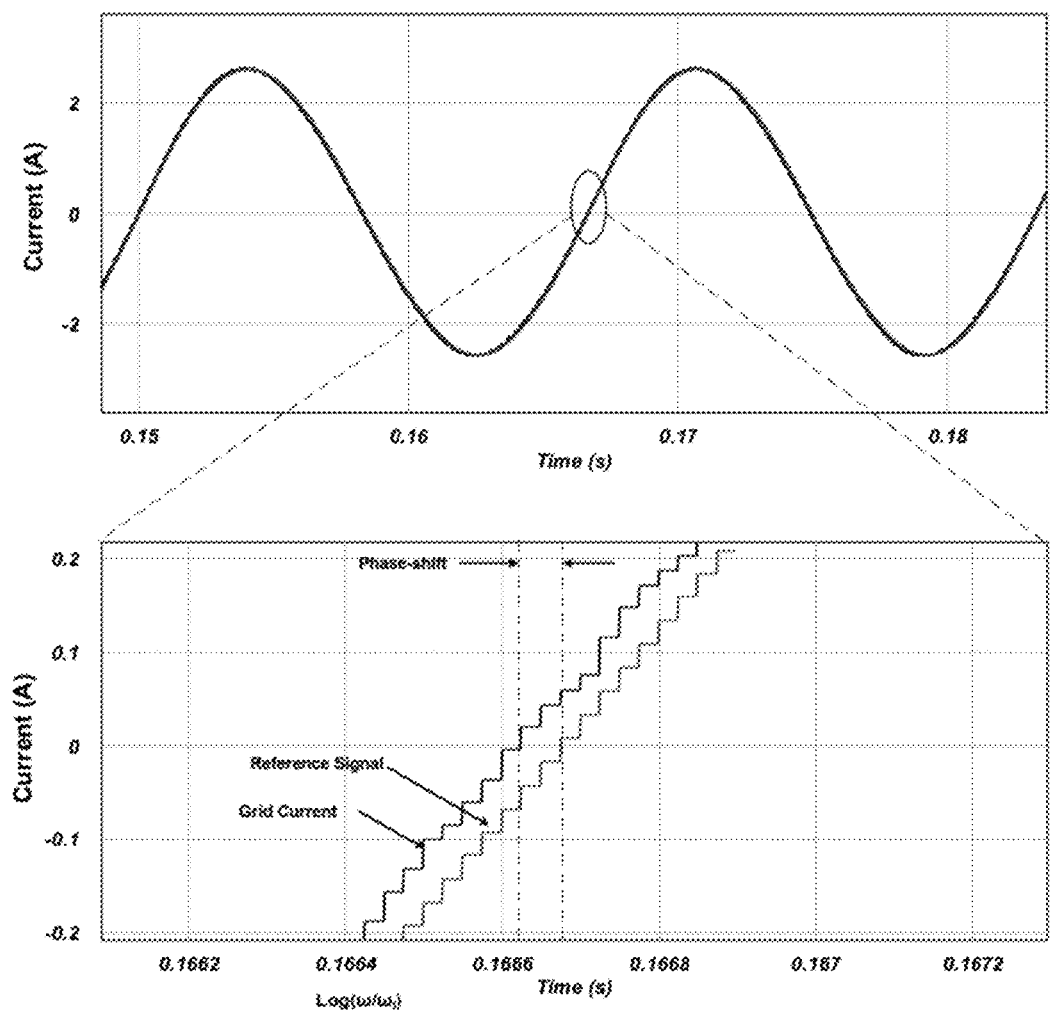
FIG. 4 shows the steady state error between the sinusoidal reference signal and the grid current as caused by the discrete approximation.

FIG. 3 shows the Bode plot of the continuous-time transfer function given by Eqn. (2) as well as the discrete-time transfer function given by Eqn. (6). According to this figure, the resonant frequency of the PR controller resulting from the discrete-time transfer function deviates due to the discrete approximation (bi-linear transformation) of the transfer function. This deviation creates steady-state error in the tracking of the sinusoidal reference signal. FIG. 4 shows the steady-state error between the sinusoidal reference signal and the grid current caused by the discrete approximation.

Figure 5:
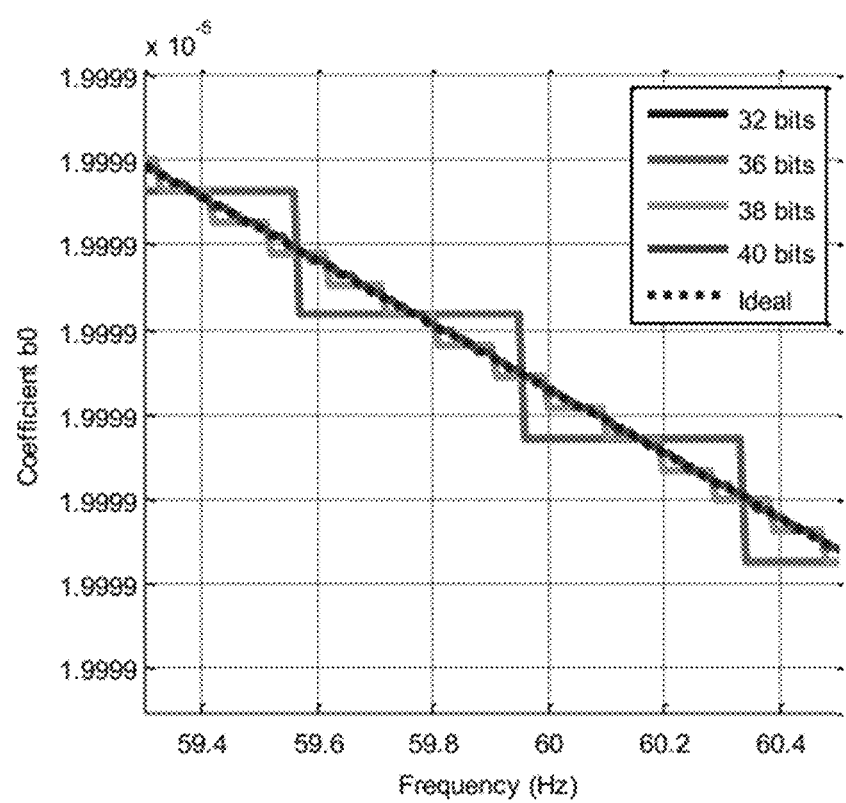
FIG. 5 illustrates the number of digital bits required to digitally implement a coefficient in a digital implementation of a PR controller.
Figure 6:
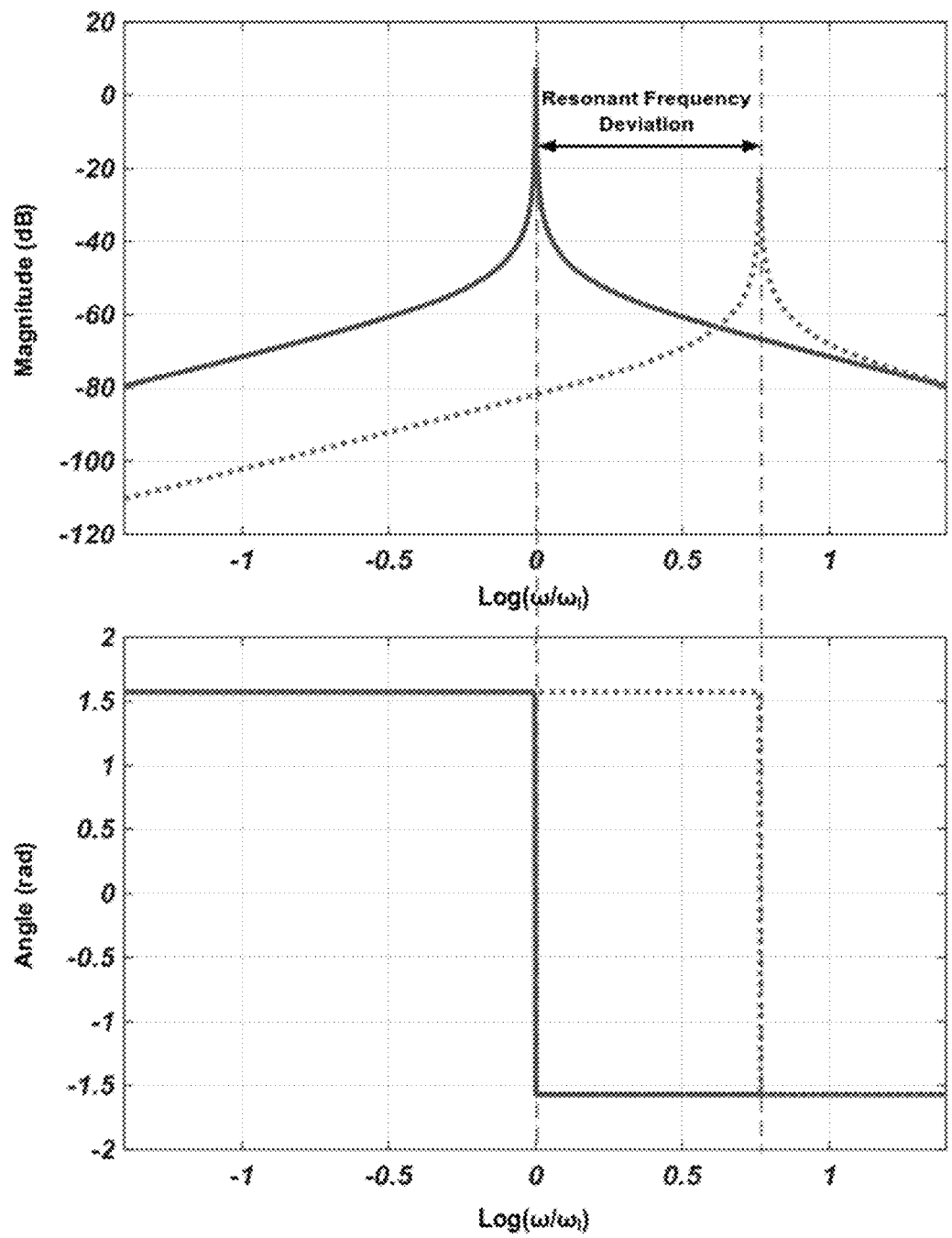
FIG. 6 illustrates the resonant frequency deviation of the PR controller due to coefficient inaccuracy because of truncation.

The second challenge in the digital implementation of the PR controller is the truncation of the coefficients due to the limited number of digits available to implement the PR controller. The coefficients of the PR controller must be extremely precise in order to maintain the accuracy in the resonant frequency. As an example of the need for extreme precision, for a 60 Hz system with a 25 kHz sampling frequency the PR coefficients are given by: b=1.99988630 8620532 e−05, a=−1.99977261 7241063. In order to approximate these coefficients with a reasonable accuracy, a very large number of bits is required in a digital implementation. In order to put this accuracy in perspective, the amount of bits required to digitally implement the coefficient b is shown in FIG. 5. FIG. 6 shows the resonant frequency deviation of the PR controller due to the truncation of the coefficients in the digital implementation of the PR controller.

Figure 7:
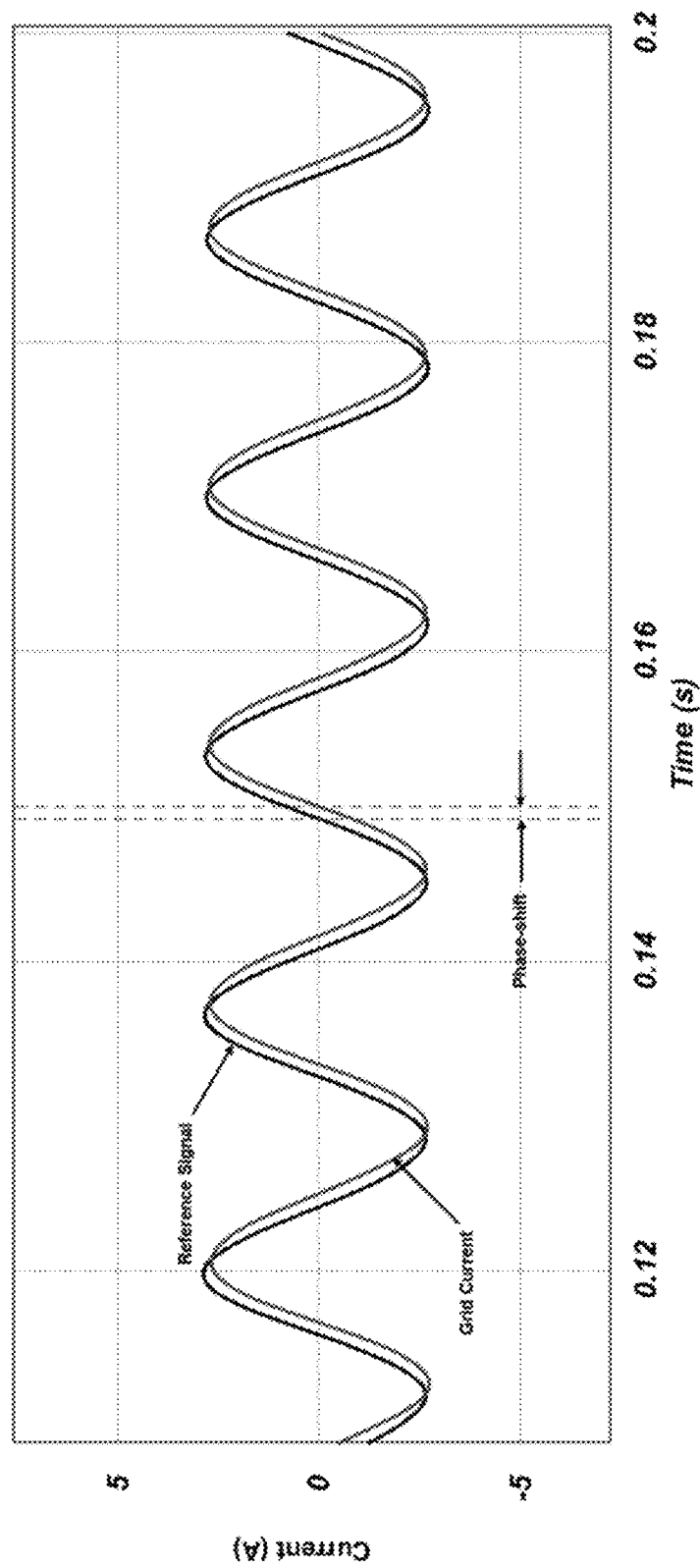
FIG. 7 illustrates the steady state error due to grid frequency variations.

The third challenge in the digital implementation of the PR controller is due to the frequency variations in the utility grid. The frequency of the grid can vary in a specific range according to the regulatory standards for interconnecting renewable energy sources with a utility grid (e.g. IEEE 1547). As distributed generation power plants become more prevalent, the range of frequency variation will be increased in order to accommodate system transients. The frequency variations have an adverse impact on the tracking of the resonant controller tuned to a fixed line frequency. The discrepancy between the tuned frequency and the grid frequency creates a steady-state error in the tracking of the reference signal. It is possible to track the line frequency by a PLL (phase locked loop) and to adaptively calculate the coefficients based on Eqns. (7)-(8). However, this requires extremely intensive calculations which would significantly increase the complexity of the control algorithm. FIG. 7 shows the steady-state error due to the grid frequency variations.

In one aspect, the present invention provides for an advanced PR controller which uses an adaptive update law to improve the performance of the conventional PR-controller. The adaptive update law works by continuously and automatically updating the coefficients of the PR-controller to remove the steady-state phase error produced by the deviation in the resonant frequency. This allows the PR-controller to offer near perfect tracking of the reference signal. By adaptively changing the coefficients of the PR-controller, it is also possible to remove the tracking error produced by changes in the grid frequency. Normally, the PR-controller has a very narrow band of high gain at the nominal grid frequency. Any deviations in the frequency outside of this very narrow band causes the gain to drop significantly. By using the adaptive PR-controller, small changes in the grid frequency can be compensated for by adaptively changing the controller coefficients.

Figure 8:
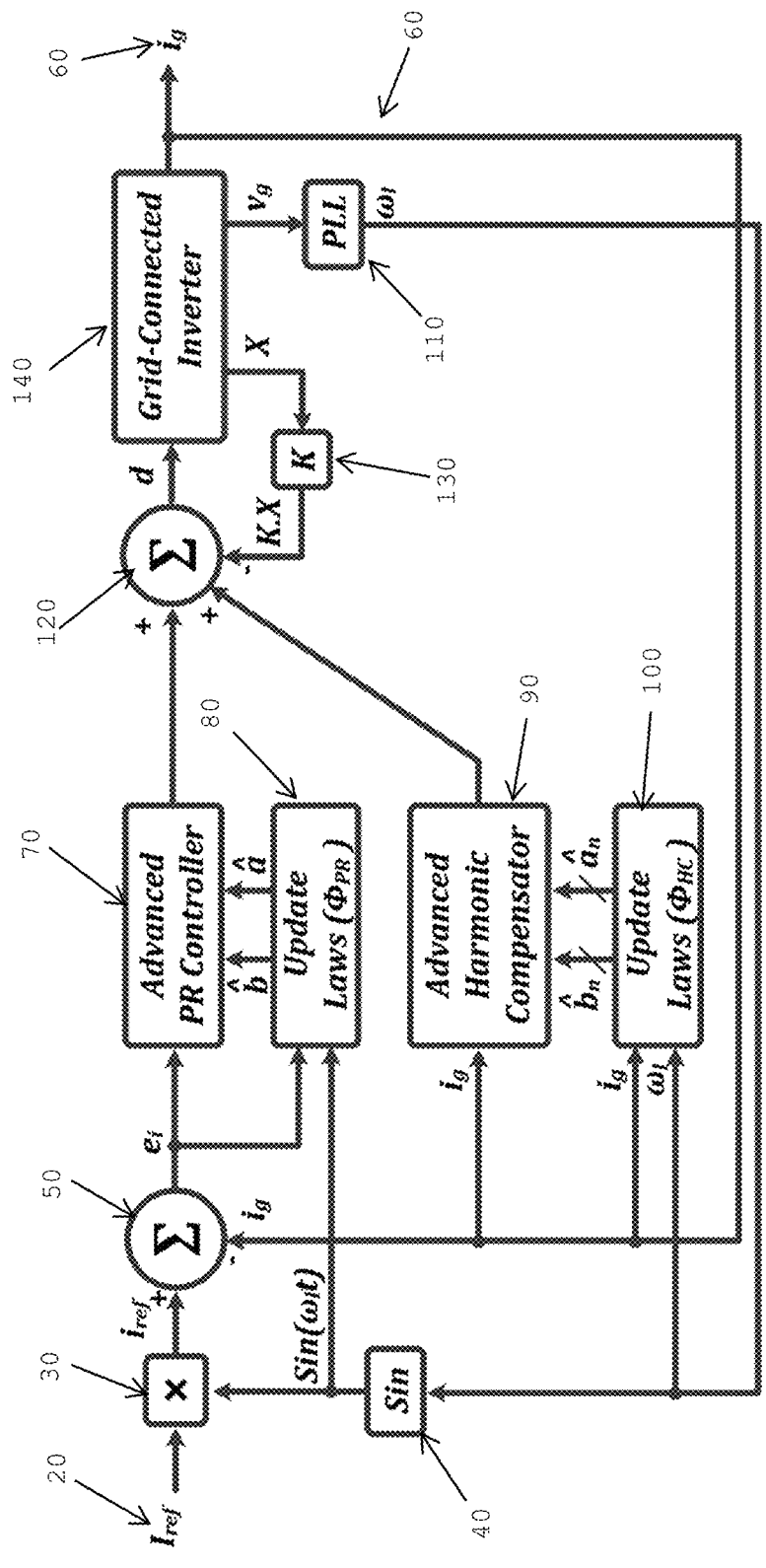
FIG. 8 is a block diagram of the closed-loop control system according to one aspect of the invention.

In FIG. 8, the block diagram of the closed-loop control system according to one aspect of the invention is presented. In FIG. 8, the system 10 has, as input, a reference current $I_{ref}$ 20. A multiplier 30 multiplies this current 20 by $\sin(\omega_l t)$ from sine block 40. The result, $i_{ref}$, is added by summation block 50 to a negative of a feedback signal from the output 60 of the system. The result from the summation block 50 is then fed to an advanced PR controller block 70 and to a first update law block 80. The first update law block 80 sends its output to the PR controller block 70 and also receives the output of the sine block 40. The output feedback signal 60 is also sent to an advanced harmonic compensator block 90 and to a second update law block 100. This second update law block 100 sends its outputs to the harmonic compensator block 90 and receives the output of a PLL (phase locked loop) block 110. This output of the PLL block 110 is the frequency ($\omega_l$) of the output voltage signal and is fed to the sine block 40.

The output of the advanced PR controller block 70 and the output of the harmonic compensator block 90 are summed by a summation block 120 along with the negative of the output of a multiplier block 130. The multiplier block 103 multiplies the value of X from a grid connected inverter 140 by the constant K. The output d (duty cycle) of the summation block 120 is sent to the inverter block 140. The output of the inverter block 140 is the grid current $i_g$ and the grid voltage $v_g$. The voltage $v_g$ is fed to the PLL block 110 while the current $i_g$ is sent to the grid and back to the system as the feedback signal 60.

Figure 9:
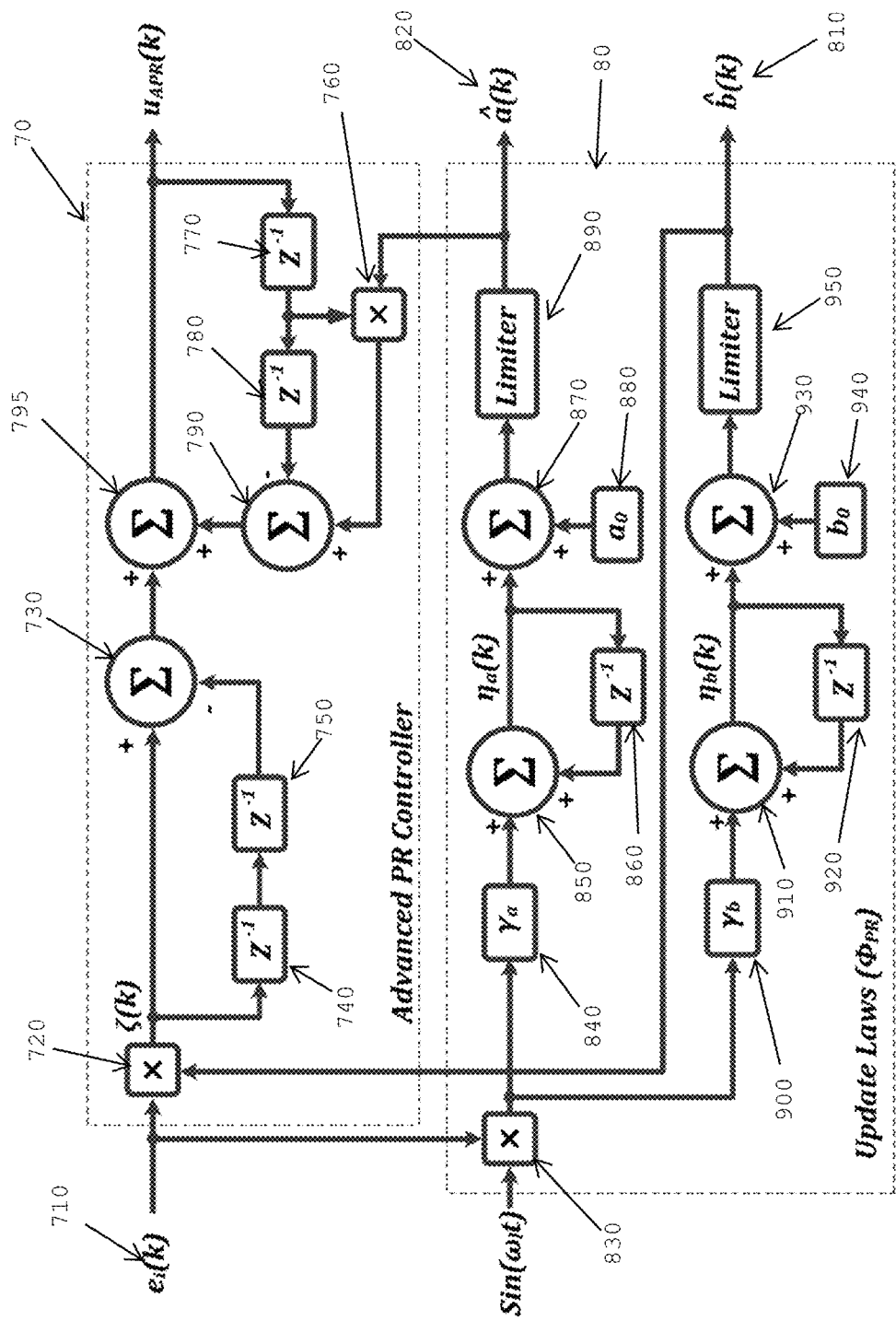
FIG. 9 is a block diagram illustrating the internal structure of the advanced PR controller according to one aspect of the invention along with the internal structure of the first update block.

As shown in FIG. 8, the update laws (from the first update law block 80) of the advanced PR controller block 70 continuously change the coefficients to produce smooth tracking with no steady-state error. Furthermore, the advanced harmonic compensator block 90 has a similar set-up, because it is also a collection of PR-controllers with resonant frequencies tuned to the filtered harmonic frequencies. Thus, the coefficients of the PR-controllers within the advanced harmonic compensator block 90 are also continuously updated to remove the steady-state error and thereby produce nearly perfect tracking of the harmonic reference signals. FIG. 9 shows the structure of the advanced PR-controller block 70 with its update laws block 80. In the advanced PR controller, the coefficients of the control scheme are produced by the update laws. The update laws use the value of the current error to make adjustments to the nominal coefficients such that the steady-state error is rendered zero. The update laws for the advanced PR-controller in the present invention are given by:

$$\hat{a} = \gamma_a e_i \sin(\omega_f t) \quad (9)$$

$$\hat{b} = \gamma_b e_i \sin(\omega_f t) \quad (10)$$

For clarity, it should be noted that $e_i$ in the equations are, from FIG. 8, equal to $e_i = i_{ref} - i_g$. As well, it should be noted that $\gamma_a$ and $\gamma_b$ are positive coefficients which determine the speed of the update laws.

Referring to FIG. 9, the internal components of the advanced PR controller 70 and of the first update laws block 80 are illustrated. Within the controller block 70, the output of summation block 50 is received as input 710 to the controller block. This input 710 is received by a multiplier block 720 which multiplies this input 710 by a second output 810 (controller coefficient b(k)) of the update laws block 80. The result of the multiplier block 720 is sent down two paths, the first being to a summation block 730 and the second leading to two successive z blocks 740, 750. Each of the z blocks apply 1/z to its input and the net effect of the two blocks 740, 750 is to apply $1/z^2$ to the result of the multiplier block 720. The result of block 750 is then subtracted from the result of multiplier block 720 by summation block 730.

On the other side of the controller block 70, the first output 820 (controller coefficient a(k)) of the update block 80 is multiplied by multiplier block 760 with the result of z block 770. The result of z block 770 is also sent to another z block 780. The result of z block 780 is subtracted from the result of multiplier 760 by summation block 790. The result from summation block 790 is then added to the result from summation block 730 by summation block 795. The result of summation block 795 is the output of the controller 70.

Referring to the update laws block 80 in FIG. 9, the input to this block is the function $\sin(\omega_f t)$ received by the multiplier block 830. This multiplier block 830 multiplies the input to block 80 with the input to controller block 70. The output of this multiplier block 830 is multiplied by multiplier block 840 by $\gamma_a$ and the result is then fed to summation block 850. The result of summation block 850 is passed through a z block 860 that applies 1/z to this result. As can be seen, the result of z block 860 is sent to the summation block 850. The result of summation block 850 is also added by summation block 870 to a value $a_0$ 880. This value 880 is the previous value for variable a or the first output 820 of the update block 80. This is also one of the coefficients that the update block 80 updates. The result of summation block 870 is then fed into a limiter block 880. The output of the limited block 880 is the first output 820 of the update block 80.

The bottom part of the update block 80 in FIG. 9 has the components used to generate the updated coefficient that is the second output 810 of the update block 80. The output of the multiplier 830 is sent to a multiplier block 900 that multiplies it by $\gamma_b$. The result of multiplier block 900 is added by a summation block 910 to the result of z block 920. The result of summation block 910 is sent to z block 920. The result of summation block 910 is also sent to summation block 930 which adds it to the value $b_0$ 940. The result of summation block 930 is then sent to a limited 950 and the output of this limiter 950 is the second output of the update block 80.

It should be noted that the internal structure of the harmonic compensator block is the same as that for the controller block but with different inputs. From FIG. 9, it can be seen that, for the controller block, the input is $e_i(k)$ and the input to its corresponding update law block is $\sin(\omega_f t)$. For the harmonic compensation block, the input error signal is $e_{in} = 0 - i_g$ and the input to the corresponding update block is $\sin(n\omega_f t)$. As well, the compensator block and the controller block may have different initial values for variables a and b as based on Eqns. (7) and (8).

For further clarity, it should be noted that the values for $a_0$ and $b_0$ in FIG. 9 are the initial values for the variables a and b. These initial values are constant.

The digital implementation of the advanced PR controller in the present invention is implemented through the following equations:

$$u_{APR}(k) = \zeta(k) - \zeta(k-2) + u_{APR}(k-1)\hat{a}(k) - u_{APR}(k-2) \quad (11)$$

$$\zeta(k) = \hat{b}(k)e_i(k) \quad (12)$$

$$\hat{a}(k) = a_0 + \eta_a(k) \quad (13)$$

$$\eta_a(k) = \gamma_a e_i(k)\sin(\omega_f t) + \eta_a(k-1) \quad (14)$$

$$\hat{b}(k) = b_0 + \eta_b(k) \quad (15)$$

$$\eta_b(k) = \gamma_b e_i(k)\sin(\omega_f t) + \eta_b(k-1) \quad (16)$$

Figure 10:
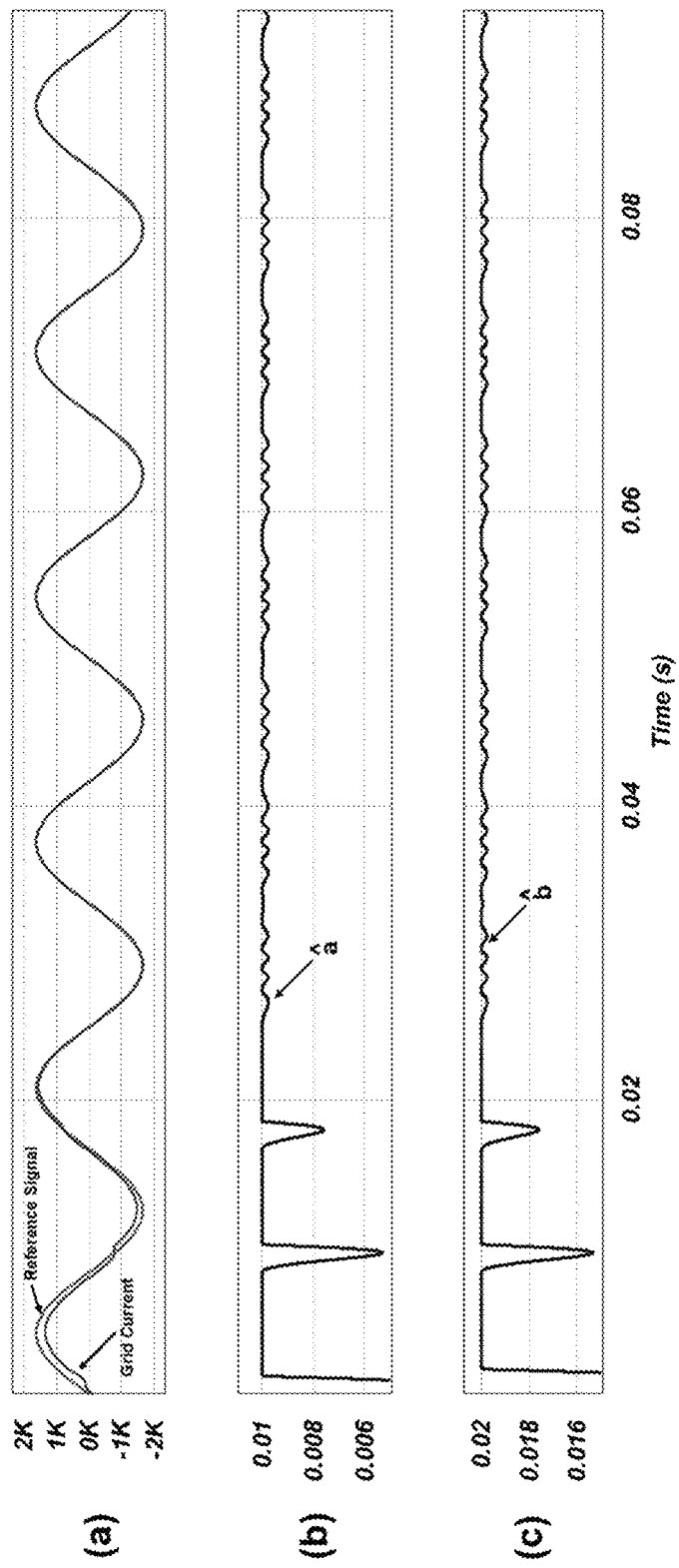
FIG. 10A details simulation results showing that, when the present invention is used, the steady-state error is effectively zero.
FIGS. 10B-10C show simulation results detailing that the update law blocks according to one aspect of the invention continuously adjust both the PR-controller coefficients such that the steady-state error is maintained at zero.

Simulation results to demonstrate the efficacy of this method can be seen in FIG. 10. FIG. 10A shows that the steady-state error is effectively zero. FIG. 10B and FIG. 10C show that the update laws make continuous adjustments to both of the advanced PR-controller coefficients such that the steady-state error is maintained at zero.

Figure 11:
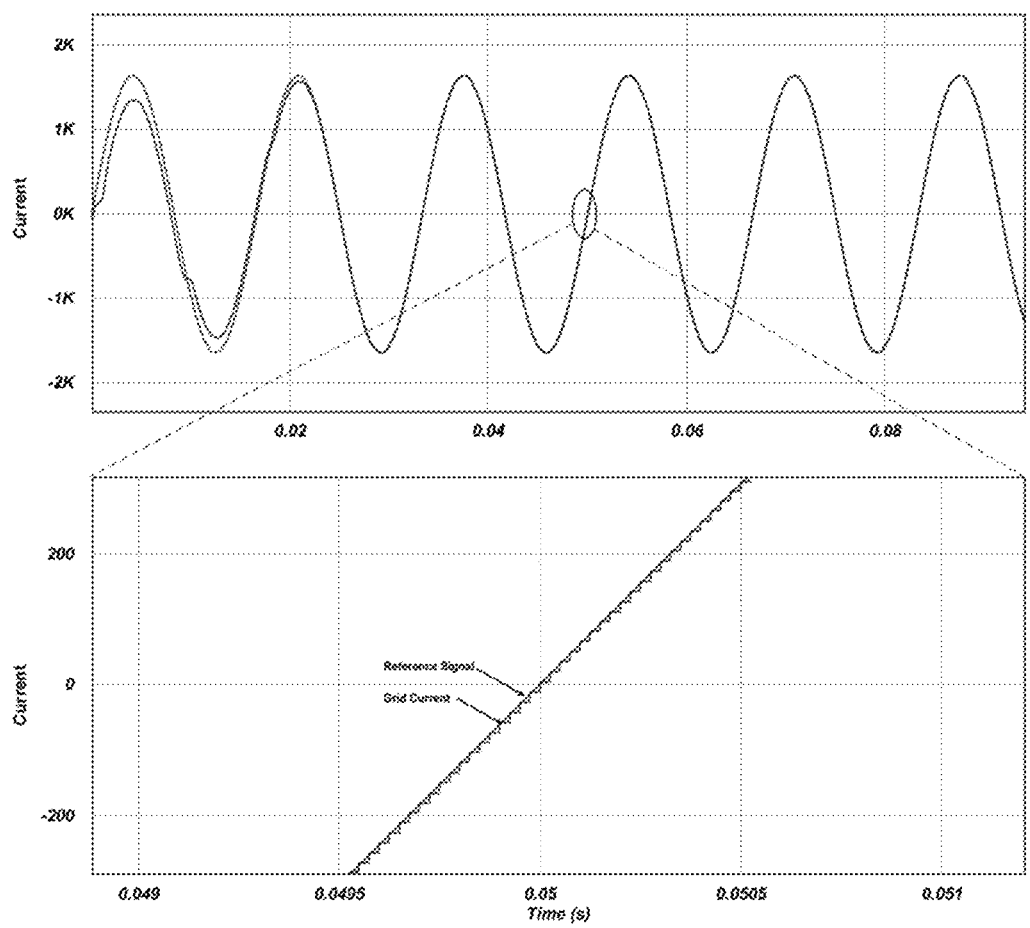
FIG. 11 illustrates a magnification of the simulation results to show that the steady-state error is pushed to zero.

In FIG. 11, a magnification of the simulation results can be seen. In this figure, it is clear that the advanced PR controller pushes the steady-state error to zero.

Figure 12:
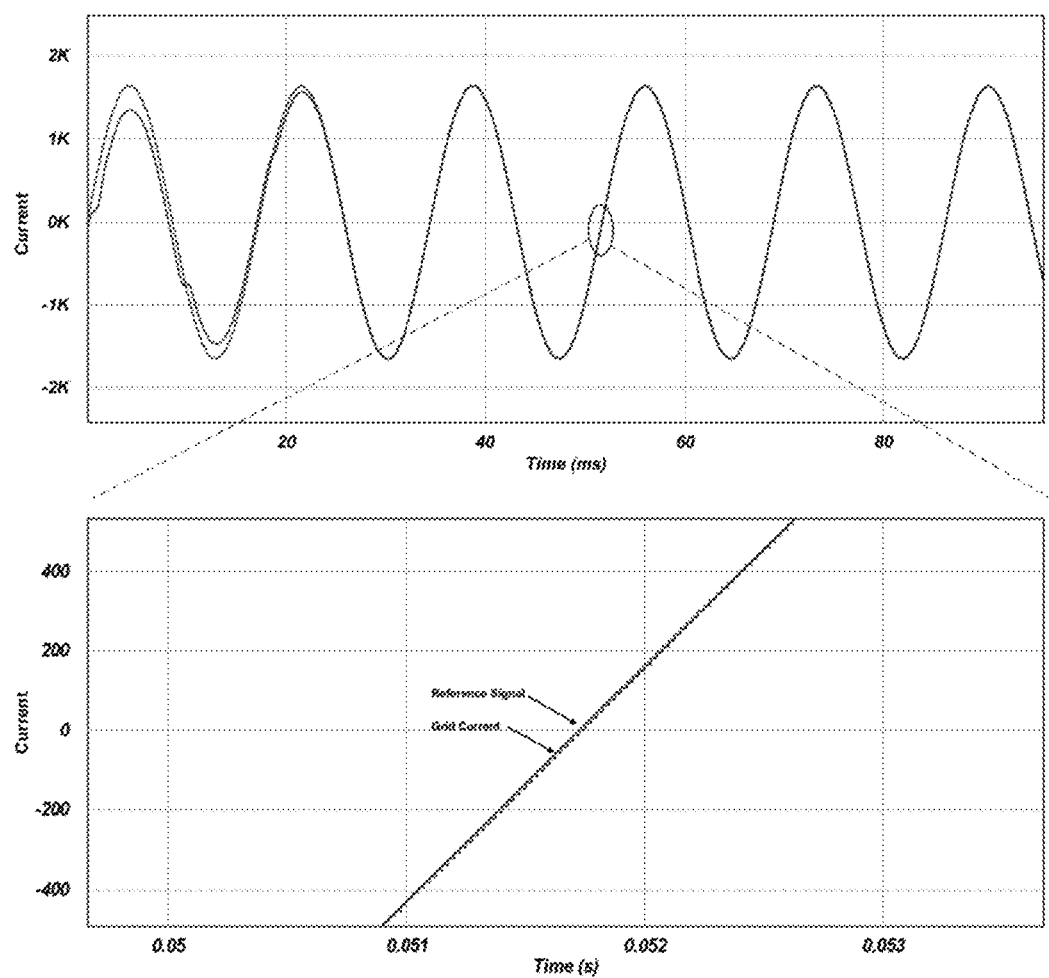
FIG. 12 show simulation results of a grid-connected inverter using the PR controller according to one aspect of the invention.

FIG. 12 shows the simulation results of the grid-connected inverter with the advanced PR controller in the present invention. In this figure the grid frequency is 58 Hz. FIG. 12 shows that the advanced PR controller can effectively compensate for grid frequency variations.

Figure 13:
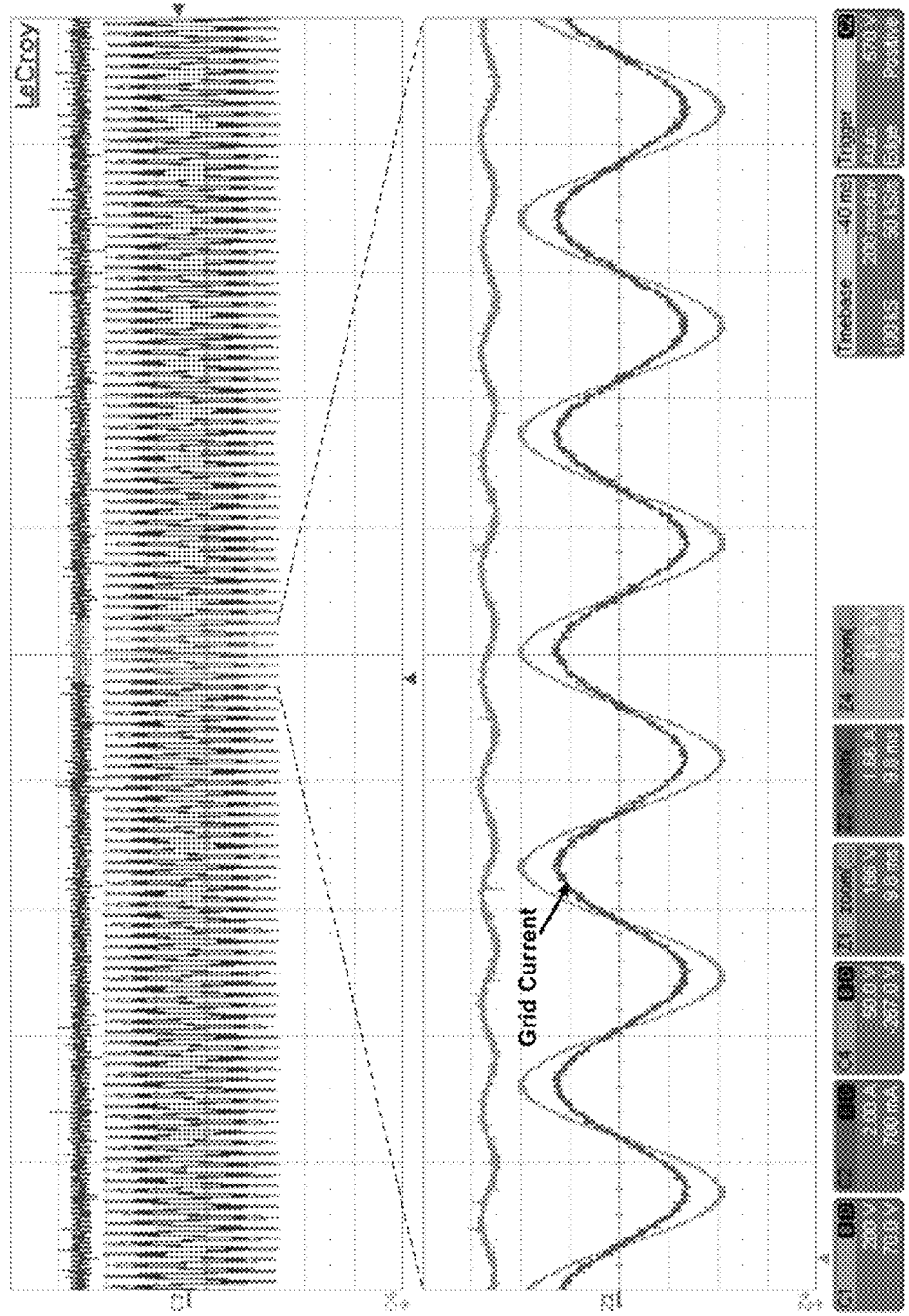
FIG. 13 show experimental waveforms for the grid-connected inverter with the PR-controller according to one aspect of the invention.

FIG. 13 shows the experimental waveforms of the rid-connected inverter with the advanced PR controller in the present invention.

It should be noted that the adaptive PR controller and the advanced harmonic compensator can both be implemented using a general purpose computing device or may be implemented using an application specific integrated circuit or ASIC. Similarly, the update blocks may also be implemented using a general purpose computing device or a dedicated computing device such as an ASIC.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for controlling a grid connected inverter, the system comprising:
    a proportional-resonant controller for sinusoidal reference tracking of a reference grid current and for providing a high gain at a specific line frequency, said controller receiving said grid current;
    a first update law block for continuously providing updated controller coefficients for said controller, said first update law block receiving said grid current and a sinusoidal signal related to said line frequency, said first update law block adjusting said controller coefficients based on said grid current and said line frequency;
    a harmonic compensator block for removing current harmonics by providing high gains at harmonic frequencies of said specific line frequency;
    a second update law block for continuously providing compensator coefficients for said harmonic compensator block, said second update law block receiving said grid current and said line frequency, said second update law block adjusting said compensator coefficients based on said grid current and said line frequency;
wherein
    outputs of said controller and said compensator are combined to produce a duty cycle signal for said inverter.

2. A system according to claim 1 wherein said controller coefficients are given by:

$$\hat{\dot{a}} = \gamma_a e_i \sin(\omega_l t)$$

$$\hat{\dot{b}} = \gamma_b e_i \sin(\omega_l t)$$

where
    $\omega_l$ represents said line frequency; and
    $e_i$ represents a difference between a reference grid current and an output current of said inverter.

3. A system according to claim 1 wherein an output of said controller is based on previous outputs of said controller.

4. A system according to claim 2 wherein an output of said controller is given by:

$$u_{APR}(k) = \zeta(k) - \zeta(k-2) + u_{APR}(k-1)\hat{a}(k) - u_{APR}(k-2)$$

where
    $u_{APR}(k)$ is th $k^{th}$ output of said controller; and
    $\zeta(k)$ is a damping parameter for said $k^{th}$ output of said controller.

5. A system according to claim 4 wherein the damping parameter is given by:

$$\zeta(k) = \hat{b}(k) e_i(k)$$

6. A system according to claim 2 wherein said system is implemented using:

$$\hat{a}(k) = a_0 + \eta_a(k)$$

$$\eta_a(k) = \gamma_a e_i(k) \sin(\omega_l t) + \eta_a(k-1)$$

$$\hat{b}(k) = b_0 + \eta_b(k)$$

$$\eta_b(k) = \gamma_b e_i(k) \sin(\omega_l t) + \eta_b(k-1)$$

7. A system according to claim 1 further comprising a linear state feedback loop, a result of said loop being combined with said output of said controller and said output of said compensator to result in said duty cycle for said inverter.

8. A method for controlling a grid connected inverter, the method comprising:
    a) receiving a grid current at a controller for said inverter and at a harmonic compensator block;
    b) receiving said grid current and a line frequency for said grid at a first and a second update blocks;
    c) determining controller coefficients for said controller based on said grid current and said line frequency;
    d) passing said controller coefficients to said controller;
    e) determining compensator coefficients for said compensator block based on said grid current and said line frequency;
    f) passing said compensator coefficients to said compensator;

g) determining a controller output based on said grid current and said controller coefficients;
h) determining a compensator output based on said grid current and said compensator coefficients;
i) combining said controller output and said compensator output to result in a duty cycle for said inverter;
j) sending said duty cycle to said inverter.

9. A method according to claim 8 wherein step h) further comprises combining a result of a linear state feedback loop with said output of said controller and said output of said compensator to result in said duty cycle for said inverter.

10. A method according to claim 8 wherein said controller coefficients are given by:

$$\hat{a} = \gamma_a e_i \sin(\omega_l t)$$

$$\hat{b} = \gamma_b e_i \sin(\omega_l t)$$

where
$\omega_l$ represents said line frequency; and
$e_i$ represents a difference between a reference grid current and an output current of said inverter.

11. A method according to claim 10 wherein an output of said controller is given by:

$$\zeta(k) = \hat{b}(k) e_i(k)$$

where
$u_{APR}(k)$ is th $k^{th}$ output of said controller; and
$\zeta(k)$ is a damping parameter for said $k^{th}$ output of said controller.

12. A method according to claim 11 wherein the damping parameter is given by:

$$\zeta(k) = \hat{b}(k) e_i(k)$$

* * * * *